US006567811B1

(12) United States Patent
Edwards et al.

(10) Patent No.: US 6,567,811 B1
(45) Date of Patent: May 20, 2003

(54) METHOD AND SYSTEM TO MERGE VOLUME GROUPS ON A UNIX-BASED COMPUTER SYSTEM

(75) Inventors: Curtis Unen Edwards, Houston, TX (US); Rick A. Hamilton, II, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/353,975

(22) Filed: Jul. 15, 1999

(51) Int. Cl.[7] .............................................. G06F 17/30
(52) U.S. Cl. ....................... 707/100; 707/101; 707/102; 711/4; 711/112; 711/114; 711/170; 714/7
(58) Field of Search .............................. 711/114, 4, 162, 711/112, 170; 707/100, 101, 102; 714/7

(56) References Cited

U.S. PATENT DOCUMENTS

| 5,129,088 A | * | 7/1992 | Auslander et al. | .......... 395/700 |
| 5,435,004 A | * | 7/1995 | Cox et al. | ................... 395/575 |
| 5,758,345 A | * | 5/1998 | Wang | .......................... 707/100 |
| 5,897,661 A | * | 4/1999 | Baranovsky et al. | ........ 711/170 |
| 5,968,184 A | * | 10/1999 | Kedem | .......................... 714/7 |
| 5,983,316 A | * | 11/1999 | Norwood | ..................... 711/112 |
| 6,216,211 B1 | * | 4/2001 | McBrearty et al. | ......... 711/162 |
| 6,282,602 B1 | * | 8/2001 | Blumeau et al. | ............... 711/4 |
| 6,341,333 B1 | * | 1/2002 | Schreiber et al. | ........... 711/114 |
| 2002/0019909 A1 | * | 2/2002 | D'Errico | ..................... 711/114 |

FOREIGN PATENT DOCUMENTS

| EP | 0319147 A2 | * | 7/1989 | ............. G06F/9/44 |

* cited by examiner

Primary Examiner—Frantz Coby
(74) Attorney, Agent, or Firm—Duke W. Yee; David A. Mims, Jr.; Michael R. Nichols

(57) ABSTRACT

Initially, a filesystem map is created, and the logical control volume block is copied outside the volume group. The initial logical control volume is deleted, and the disks are removed from the definition of the old volume group. The definition of the new volume group is defined to include the disks formerly defined in the old volume group. A file map is used to create the filesystem for the new volume group, and the volume control block is copied into the new volume group. The filesystems are reinstated onto the new volume group and remounted.

15 Claims, 10 Drawing Sheets

```
#!/bin/ksh
################################################################

# reorg_assistant.ksh      Curtis Edwards, IBM Global Services
# Feb 10, 1999     with assistance from Rick Hamilton

################################################################
# Copyright 1988, 1999 by the IBM Corporation.
################################################################
# This script, reorg_assistant.ksh, assists UNIX data reorganization
# by combining filesystems and volume groups. The syntax is that it
# takes no arguments, but it looks for the existance of a file in
# its current directory called "filemaps," containing implicit
# instructions about the Volume Groups and Filesystems to
# reorganize.
# The contents of "filemaps" is as follows:
#      ORIG_LV:ORIG_MOUNT_POINT:SIZE_IN_PPS:OLD_DISK:OLD_VG
# An example of this, easily created by the user, might look like
#      testfs:/testfs:4:hdisk4:testvg
# The variable "VGName," the first defined variable below, should be
# modified to reflect the new VG name desired.
################################################################
# Version 3.0
# Version history:
# V 1.0 - 12/16/98.  Original script.
# V 2.0 - 01/10/99.  Debugged script.  Eliminated intermittent
# hangs and cleaned up text.
▫
# V 3.0 - 03/01/99.  Added functionality to create the filemaps
# file without user intervention and cleaned up program flow.
▫

▫
################################################################

################################################################
#     GLOBAL VARIABLE DECLARATION
################################################################

# The following is the name of the VG to be added to, i.e., where
# FS should reside when all is said and done. Also the name of the
# original VG.

OLD_VG=VG1
NEW_VG=VG2
```

FIG. 9A

```
################################################################
#       FUNCTION DECLARATIONS
########################################################## function info_gather {
      lsvg -l ${OLD_VG} | grep -v jfslog | grep -v paging | awk ' {print $1":"$7":"$3}'|grep -v ${OLD_VG}|grep -v LV > filemaps

} function create_map_files {
      LV=$1
      echo creating map file for $LV
      lslv -m $LV | grep hdisk | awk ' {print $3":"$2} ' >/tmp/${OLD_VG}/mapfiles/${LV} .map
}

Below, we get rid of the old VG.

function remove_old_disks {
      Disk=$1
      echo removing $Disk from volume group $OLD_VG
      reducevg -d -f ${OLD_VG} ${Disk}
}

Extend absorbing volume group to include additional disks function add_disks {
      Disk=$1
      echo adding disks $Disk to volume group $NEW_VG
      sleep 3
      extendvg -f $NEW_VG $Disk
} function merge_file_sys {

LV=$1
      FS=$2
      Size=$3 echo Recreating Filesystem $FS on logical volume $LV in $NEW_VG as size $Size

Zero out the putlvcb command:
      >/usr/sbin/putlvcb

# Create the logical volume:
      mklv -y ${LV} -m /tmp/${OLD_VG}/filemaps/${LV} .map ${NEW_VG} ${Size}
```

FIG. 9B

```
# Copy the putlvcb command back:
cp /usr/sbin/putlvcb.orig /usr/sbin/putlvcb

# Create the filesystem definition:
imfs -1 ${LV}

# Mount the filesystem:
echo 'Mounting the filesystem.'
mount ${FS} synclvodm ${NEW_VG}
}

###################################################################
#                   MAINLINE CODE
###################################################################

{ echo " "
echo "$0, Copyright 1998, 1999, by the IBM Corporation."
echo " "

sleep 3
mkdir /tmp/${OLD_VG}/mapfiles
cd /tmp/${OLD_VG}/mapfiles
info_gather
sleep 3
        while 'read Record'
           do
              LogVol='echo $Record | cut -d':' -f1'
              FilSys='echo $Record | cut -d':' -f2' create_map_files $LogVol    # Done
              echo unmounting $FilSys     # Unmount old filesystems
              unmount $FilSys             # Remove old filesystems
              rmfs $FilSys done <filemaps

Perform check of putlvcb.

if [[ -s /usr/sbin/putlvcb ]]
        then
              echo "putlvcb exists and has a size greater than zero"
              cp /usr/sbin/putlvcb /usr/sbin/putlvcb.orig  # copy control
block
```

*FIG. 9C*

```
        else
                echo "PUTLVCB either does not exist, or has a zero length.
Please correct and then run program again."
                echo "Program exiting due to lack of PUTLVCB command!"
                exit  (0)
        fi sleep 3 cat /tmp/${OLD_VG}/mapfiles/*.map | awk -F":" ' {print $1}' | sort
-u > /tmp/${OLD_VG}/old.disks sleep 3 while 'read Record'
          do
                OLD_DISK='echo $Record'
                remove_old_disks $OLD_DISK
        done </tmp/${OLD_VG}/filemaps/old.disks
        varyoffvg ${OLD_VG}
        exportvg ${OLD_VG} sleep 3 while 'read Record'
          do
                OLD_DISK='echo $Record'
                add_disks ${OLD_DISK}
        done </tmp/${OLD_VG}/filemaps/old.disks sleep 3 while 'read Record'
          do
                LogVol ='echo $Record | cut -d':' -f1'
                FilSys ='echo $Record | cut -d':' -f2'
                FSSize ='echo $Record | cut -d':' -f3' merge_file_sys $LogVol $FilSys $FSSize done <filemaps

Resync the volume group:
syncvg ${VGName}
} >>/tmp/mergvgs.log 2>&1 echo "Done with reorganization!"
```

FIG. 9D

METHOD AND SYSTEM TO MERGE VOLUME GROUPS ON A UNIX-BASED COMPUTER SYSTEM

BACKGROUND OF THE INVENTION

1. Technical Field

The present invention relates to information systems technology. More particularly, the present invention relates to the storage of information in a computer system. Still more particularly, the present invention relates to a method and system of merging physical groups of storage devices.

2. Description of Related Art

The UNIX operating system, or "UNIX," "A weak pun on Multics," is an interactive time-sharing operating system invented in 1969 by Ken Thompson after he left Bell Labs and the Multics project, apparently to play games on his scavenged PDP-7 computer (minicomputer sold by Digital Electric Corp. (DEC), (Compaq Computer Corp., 20555 SH 249, Houston, Tex. 77070)). Thompson developed a new programming language 'B', and Dennis Ritchie enhanced 'B' to 'C' and helped develop 'UNIX'.

The UNIX operating system is a multi-user operating system supporting serial or network connected terminals for more than one user. It supports multi-tasking and a hierarchical directory structure for the organization and maintenance of files. UNIX is portable, requiring only the kernel (<10%) written in assembler, and supports a wide range of support tools including development, debuggers, and compilers.

The UNIX operating system consists of the kernel, shell, and utilities. The kernel schedules tasks, manages data/file access and storage, enforces security mechanisms, and performs all hardware access. The shell presents each user with a prompt, interprets commands typed by a user, executes user commands, and supports a custom environment for each user. Finally, the utilities provide file management (rm, cat, ls, rmdir, mkdir), user management (passwd, chmod, chgrp), process management (kill, ps), and printing (lp, troff, pr).

A multi-user operating system allows more than one user to share the same computer system at the same time. It does this by time-slicing the computer processor at regular intervals between the various people using the system. Each user gets a set percentage of some amount of time for instruction execution during the time each user has the processor. After a user's allotted time has expired, the operations system intervenes, saving the program's state (program code and data), and then starts running the next user's program (for the user's set percentage of time). This process continues until, eventually, the first user has the processor again.

It takes time to save/restore the program's state and switch from one program to another (called dispatching). This action is performed by the kernel and must execute quickly, because it is important to spend the majority of time running user programs, not switching between them. The amount of time that is spent in the system state (i.e., running the kernel and performing tasks like switching between user programs) is called the system overhead and should typically be less than 10%.

Switching between user programs in main memory is done by part of the kernel. Main system memory is divided into portions for the operating system and user programs. Kernel space is kept separate from user programs. Where there is insufficient main memory to run a program, some other program residing in main memory must be written out to a disk unit to create some free memory space. A decision is made about which program is the best candidate to swap out to disk. This process is called swapping. When the system becomes overloaded (i.e., where there are more people than the system can handle), the operating system spends most of its time shuttling programs between main memory and the disk unit, and response time degrades.

In UNIX operating systems, each user is presented with a shell. This is a program that displays the user prompt, handles user input, and displays output on the terminal. The shell program provides a mechanism for customizing each user's setup requirements, and storing this information for re-use (in a file called profile).

When the UNIX operating system starts up, it also starts a system process (getty) which monitors the state of each terminal input line. When getty detects that a user has turned on a terminal, it presents the logon prompt; and once the password is validated, the UNIX system associates the shell program (such as sh) with that terminal (typically there are a number of different shells including ksh and csh). Each user interacts with sh, which interprets each command typed. Internal commands are handled within the shell (set, unset);

external commands are invoked as programs (ls, grep, sort, ps).

Multi-tasking operating systems permit more than one program to run at once. This is done in the same way as a multi-user system, by rapidly switching the processor between the various programs. OS/2, available from IBM Corporation, One New Orchard Road, Armonk, N.Y. 10504; and Windows 95, available from Microsoft Corporation, One Microsoft Way, Redmond, Wash. 98052, are examples of multi-tasking single-user operating systems. UNIX is an example of a multi-tasking multi-user operating system. A multi-user system is also a multi-tasking system. This means that a user can run more than one program at once, using key selections to switch between them. Multi-tasking systems support foreground and background tasks. A foreground task is one the user interacts directly with using the keyboard and screen. A background task is one that runs in the background (i.e., It does not have access to the screen or keyboard.). Background tasks include operations like printing, which can be spooled for later execution.

The role of the operating system is to keep track of all the programs, allocating resources like disks, memory, and printer queues as required. To do this, it must ensure that one program does not get more than its fair share of the computer resources. The operating system does this by two methods: scheduling priority, and system semaphores. Each program is assigned a priority level. Higher priority tasks (like reading and writing to the disk) are performed more regularly. User programs may have their priority adjusted dynamically, upwards or downwards, depending upon their activity and available system resources. System semaphores are used by the operating system to control system resources. A program can be assigned a resource by getting a semaphore (via a system call to the operating system). When the resource is no longer needed, the semaphore is returned to the operating system, which can then allocate it to another program.

Disk drives and printers are serial in nature. This means that only one request can be performed at any one time. In order for more than one user to use these resources at once, the operating system manages them via queues. Each serial device is associated with a queue. When a user program wants access to the disk, for example, it sends the request to the queue associated with the disk. The operating system runs background tasks (called daemons), which monitor these queues and service requests from them. A request is then performed by this daemon process, and the results are sent back to the user's program.

Multi-tasking systems provide a set of utilities for managing processes. In UNIX, these are ps (list processes), kill (kill a process), and & (run a process in the background). In UNIX, all user programs and application software use the system call interface to access system resources like disks, printers, memory etc. The system call interface in UNIX provides a set of system calls (C functions). The purpose of the system call interface is to provide system integrity. As all low level hardware access is under control of the operating system, this prevents a program from corrupting the system.

The operating system, upon receiving a system call, validates its authenticity or permission, then executes it on behalf of the program, after which it returns the results. If the request is invalid or not authenticated, then the operating system does not perform the request but simply returns an error code to the program. The system call is accessible as a set of 'C' functions, as the majority of UNIX is also written in 'C'. Typical system calls are: _read—for reading from the disk unit; _write—for writing to the disk unit; _getch—for reading a character from a terminal; _putch—for writing a character to the terminal; and _ioctl—for controlling and setting device parameters.

The fundamental structure that the UNIX operating system uses to store information is the file. A file is a sequence of bytes, typically 8 bits long, and is equivalent to a character. UNIX keeps track of files internally by assigning each one a unique identifying number. These numbers, called inode numbers, are used only within the UNIX operating system kernel itself. While UNIX uses inode number to refer to files, it allows users to identify each file by a user-assigned name. A file name can be any sequence containing from one to fourteen characters.

There are three types of files in the UNIX file system: (1) ordinary files, which may be executable programs, text, or other types of data used as input or produced as output from some operation; (2) directory files, which contain lists of files; and (3) special files, which provide a standard method of accessing I/O devices.

UNIX provides users with a way of organizing files. Files may be grouped into directories. Internally, a directory is a file that contains the names of ordinary files and other directories, and their corresponding inode numbers. Given the name of a file, UNIX looks in the file's directory and obtains the corresponding inode number for the file. With this inode number, UNIX can examine other internal tables to determine where the file is stored and make it accessible to the user. UNIX directories themselves have names, each of which may also contain fourteen characters.

Just as directories provide a means for users to group files, UNIX supports the grouping of directories into a hierarchical file system. At the very top of a hierarchy is a directory. It may contain the names of individual files and the names of other directories. These, in turn, may contain the names of individual files and still other directories, and so on. A hierarchy of files is the result. The UNIX file hierarchy resembles an upside-down tree, with its root at the top. The various directories branch out until they finally trace a path to the individual files, which correspond to the tree's leaves. The UNIX file system is described as "tree-structured," with a single directory. All the files that can be reached by tracing a path down through the directory hierarchy from the root directory constitute the file system.

UNIX maintains a great deal of information about the files that it manages. For each file, the file system keeps track of the file's size, location, ownership, security, type, creation time, modification time, and access time. All of this information is maintained automatically by the file system as the files are created and used. UNIX file systems reside on mass storage devices such as disk files. These disk files may use fixed or removable type media, which may be rigid or flexible. UNIX organizes a disk as a sequence of blocks, which compose the file system. These blocks are usually either 512 or 2048 bytes long. The contents of a file are stored in one or more blocks, which may be widely scattered on the disk.

An ordinary file is addressed through the inode structure. Each inode is addressed by an index contained in an i-list. The i-list is generated based on the size of the file system, with larger file systems generally implying more files and, thus, larger i-lists. Each inode contains thirteen 4-byte disk address elements. The direct inode can contain up to ten block addresses. If the file is larger than this, then the eleventh address points to the first level indirect block. Address 12 and address 13 are used for second level and third level indirect blocks, respectively, with the indirect addressing chain before the first data block growing by one level as each new address slot in the direct inode is required.

All input and output (I/O) is done by reading the writing files, because all peripheral devices, even terminals, are files in the file system. In a most general case, before reading and writing a file, it is necessary to inform the system of your intent to do so by opening the file. In order to write to a file, it may also be necessary to create it. When a file is opened or created (by way of the 'open' or 'create' system calls), the system checks for the right to do so and, if all is well, returns a non-negative integer called a file descriptor. Whenever I/O is to be done on this file, the file descriptor is used, instead of the name, to identify the file. This open file descriptor has associated with it a file table entry kept in the "process" space of the user who has opened the file. In UNIX terminology, the term "process" is used interchangeably with a program that is being executed. The file table entry contains information about an open file, including an inode pointer for the file and the file pointer for the file, which defines the current position to be read or written in the file. All information about an open file is maintained by the system.

In conventional UNIX systems, all input and output is done by two system calls, 'read' and 'write,' which are accessed from programs having functions of the same name. For both system calls, the first argument is a file descriptor. The second argument is a pointer to a buffer that serves as the data source or destination. The third argument is the number of bytes to be transferred. Each 'read' or 'write' system call counts the number of bytes transferred. On reading, the number of bytes returned may be less than the number requested, because fewer than the number requested remain to be read. A return value of zero implies end of file, a return value of −1 indicates an error of some sort. For writing, the value returned is the number of bytes actually written. An error has occurred if this is not equal to the number which was supposed to be written.

The parameters of the 'read' and 'write' system calls may be manipulated by the application program that is accessing the file. The application must, therefore, be sensitive to and take advantage of the multi-level store characteristics inherent in a standard system memory hierarchy. It is advantageous, from the application perspective, if the system memory components can be viewed as a single level hierarchy. If this is properly done, the application could dispense with most of the I/O overhead.

One advantage of using a UNIX based operating system over another operating system is that data can be isolated or segregated into different volume groups (VGs). The omnipresent "rootvg" contains the operating system details, and it is from this volume group that the computer runs. Similarly, data or application volume groups can also be created. The advantage of such volume groups is that, unlike competitive operating systems, an upgrade to a UNIX based operating system will only impact the rootvg, and will not affect application data. Analogously, application upgrades will not impact the operating system in any way, presuming that the application has been segregated into its own VG.

In today's dynamic information systems (IS) environment, organizational components experience constant change. These changes involve everything from operating system and application upgrades, to network infrastructure, to data layouts across disks. This last concept, the movement of data into new storage locations, has become increasingly prevalent given the ever more complex disk configurations that IS shops are using. In the days when disk sizes were measured in megabytes, and arrays were nonexistent, data architectures remained relatively static. In today's large IS shops, however, where SSA or SCSI disk arrays provide storage in the tens or hundreds of gigabytes, the physical layout of data upon those disks often has a need to change.

An example of this would be a database whose needs have grown faster than expected, and a customer with a requirement to move data from a simple mirror configuration into a larger volume group. Previously, any such data rearrangement, complex though it might have been, had to be executed manually. Manual execution of such changes has been the norm. Moreover, the data contained in the database must itself be copied to an external storage system and verified before the filesystems and volume group can be removed in favor of an expanded volume group. Only then can the physical disks be included into the new volume group and the filesystems and files recreated in the new volume group.

It would be advantageous to provide rapid and reproducible solutions in the UNIX environment. It would further be advantageous to provide a script for allowing quicker, more comprehensive rearrangement and combination of UNIX data structures. It would be even more advantageous to provide an automated tool for performing these processes, so that the processes can be accomplished more quickly and more efficiently, with less room for administrator error.

SUMMARY OF THE INVENTION

The present invention relates to a system and method for merging volume groups on a UNIX based computer system. Initially, a filesystem map is created, and the logical control volume block is copied outside the volume group. The initial logical volume is deleted, and the disks are removed from the definition of the old volume group. The definition of the new volume group is defined to include the disks formerly defined in the old volume group. The filesystem map that was created is used to recreate the filesystem in the new volume group, and the volume control block is copied into the new volume group. The filesystems are reinstated onto the new volume group and remounted.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 9A–D constitute a computer code depicting the process of merging volume groups in an AIX based system.

DETAILED DESCRIPTION OF THE PREFERRED EMBODIMENT

Figure 1:
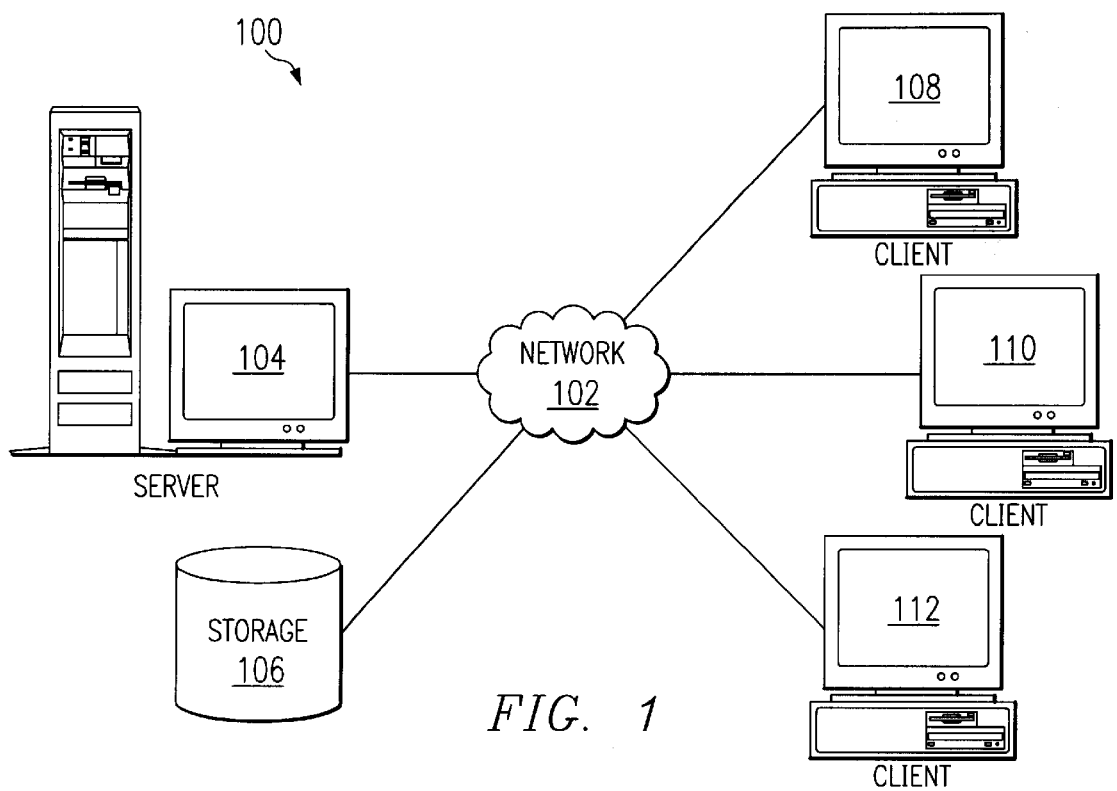
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications to clients 108, 110 and 112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another.

At the heart of the Internet is a backbone of high-speed data communication lines between major nodes or host computers, consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention.

Figure 2:
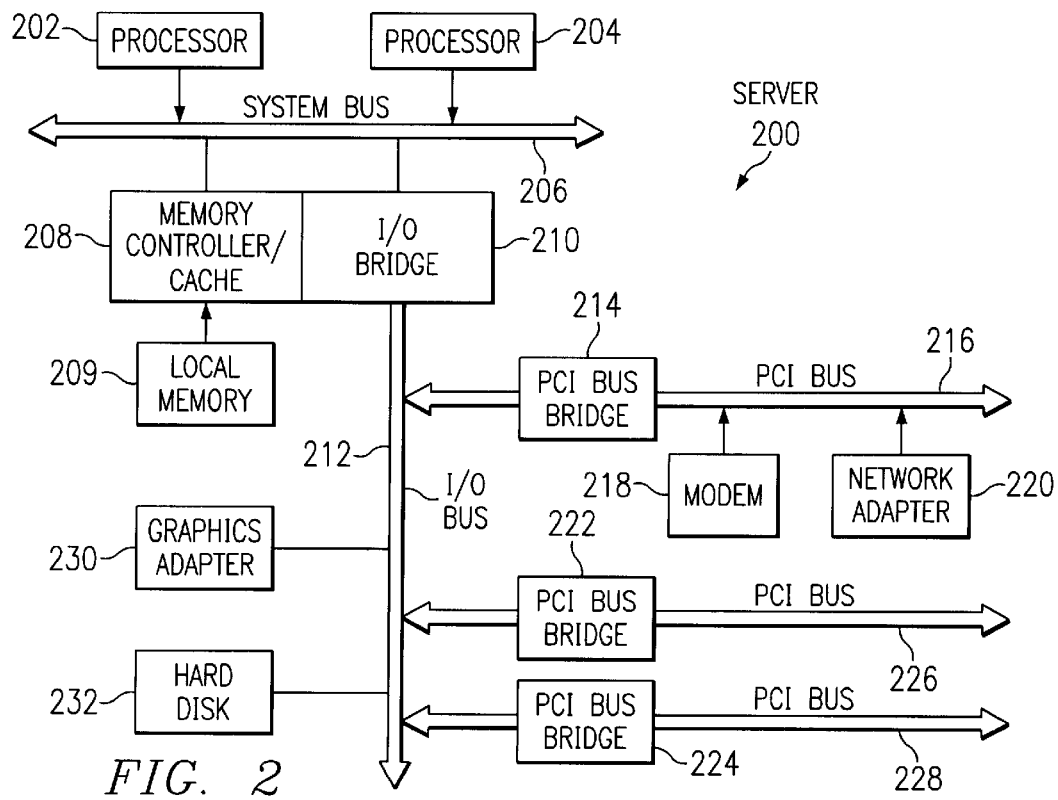
FIG. 2 is a block diagram depicting a data processing system that may be implemented as a server in accordance with a preferred embodiment of the present invention.

Referring to FIG. 2, a block diagram depicts a data processing system which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
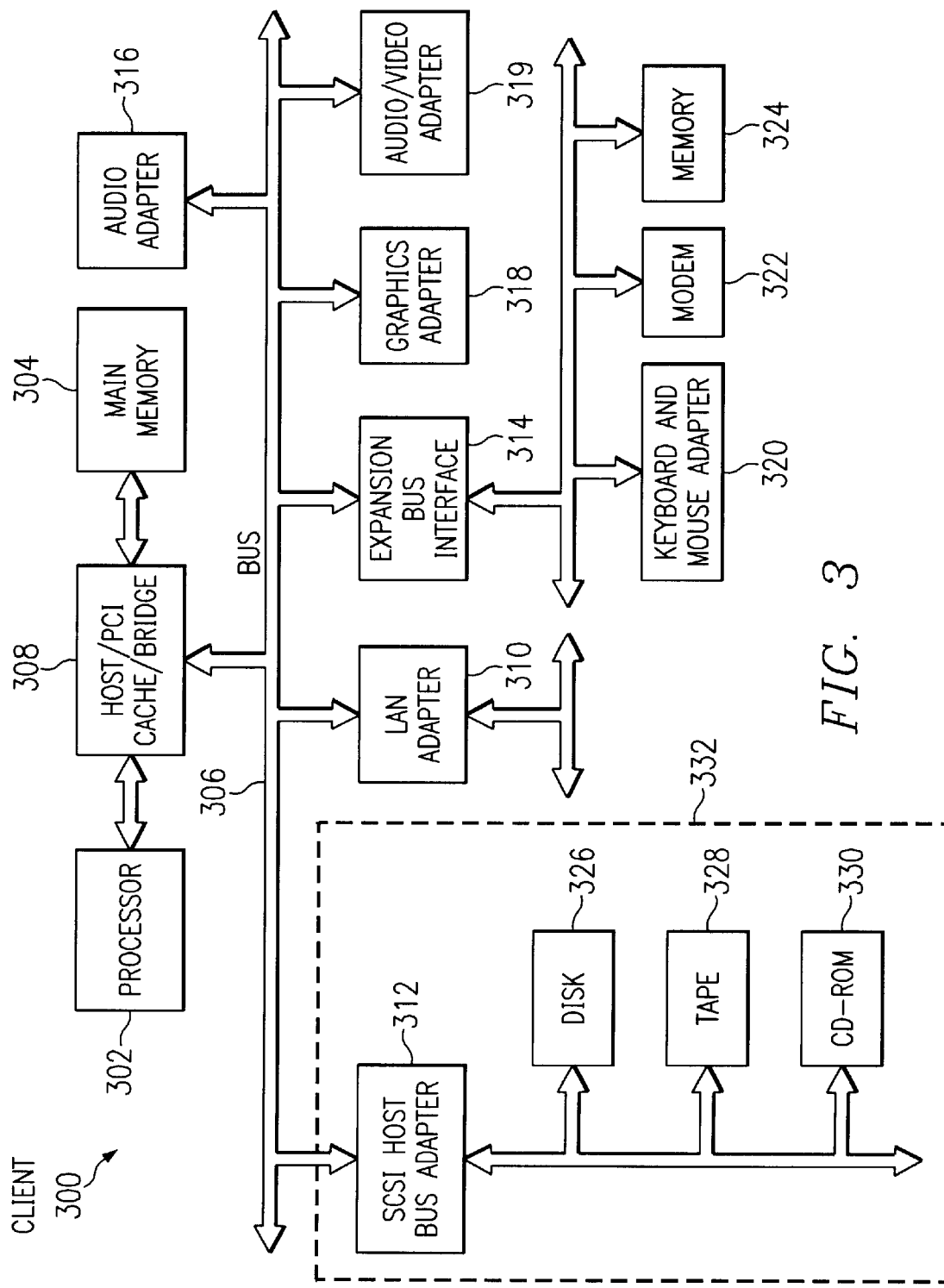
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations support three or four PCI expansion slots or add-in connectors.

An operating system runs on processor 302 and is used to coordinate and provide control of various components within data processing system 300 in FIG. 3. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data.

The depicted example in FIG. 3, as well as above-described examples, are not meant to imply architectural limitations.

Figure 4:
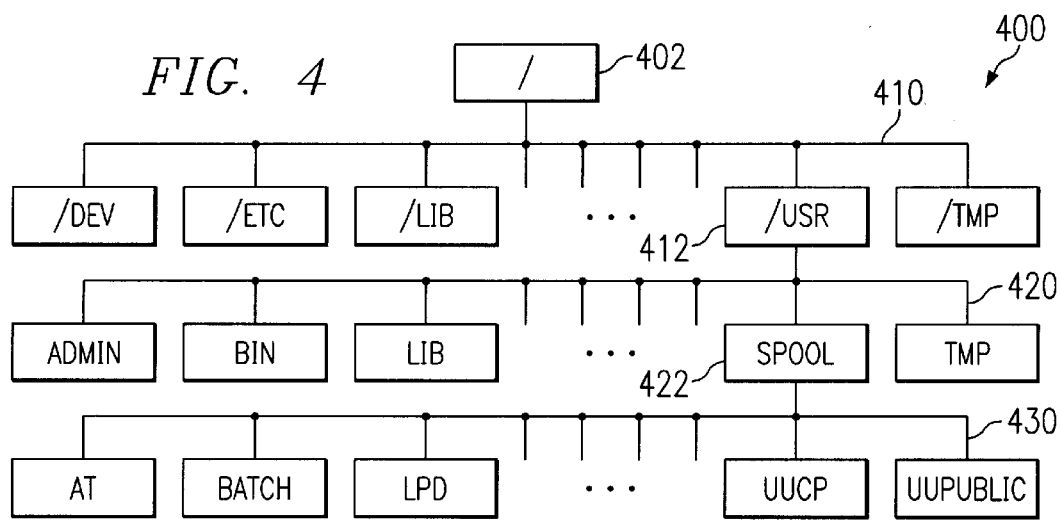
FIG. 4 illustrates a logical filesystem arrangement as is conventional in a UNIX based filesystem.

FIG. 4 illustrates a logical filesystem arrangement as is conventional in a UNIX based filesystem. Logical filesystem refers to a hierarchy of connected directories that are accessible by the user. All UNIX systems are provided with at least one permanent, non-removable hard disk system. The root directory and the directories below it are stored on this disk. Its structure is known as the root file system. The UNIX filesystem is arranged in a tree, or inverted pyramid, where all the files are logically connected to root file 402. There are slight differences in the arrangement of directories among different types of UNIX systems. However, the overall structure is basically the same. Note that, although only one branch of the tree is shown for each level, each of the directories potentially contains subdirectories.

If an additional hard disk is added, UNIX creates a separate new filesystem on this disk. Before it can be used, it must be attached to the root file system. This is called mounting an additional filesystem. An empty directory on the root file system is selected as the mount point and, using the UNIX mount command, the new filesystem appears under this directory.

Filesystem 400 is a directory filesystem. Connected to its root level are the directory files /dev to /tmp. Filesystem 400 is merely exemplary and does not contain every file that may be found in a UNIX filesystem.

Each file in level 410 is logically connected to root file 402. The structure cascades through each level, from one logically connected file contained in the next higher level. For instance, level 420 is logically connected to file /usr 412. Similarly, level 430 is logically connected to file spool 422.

Figure 5:
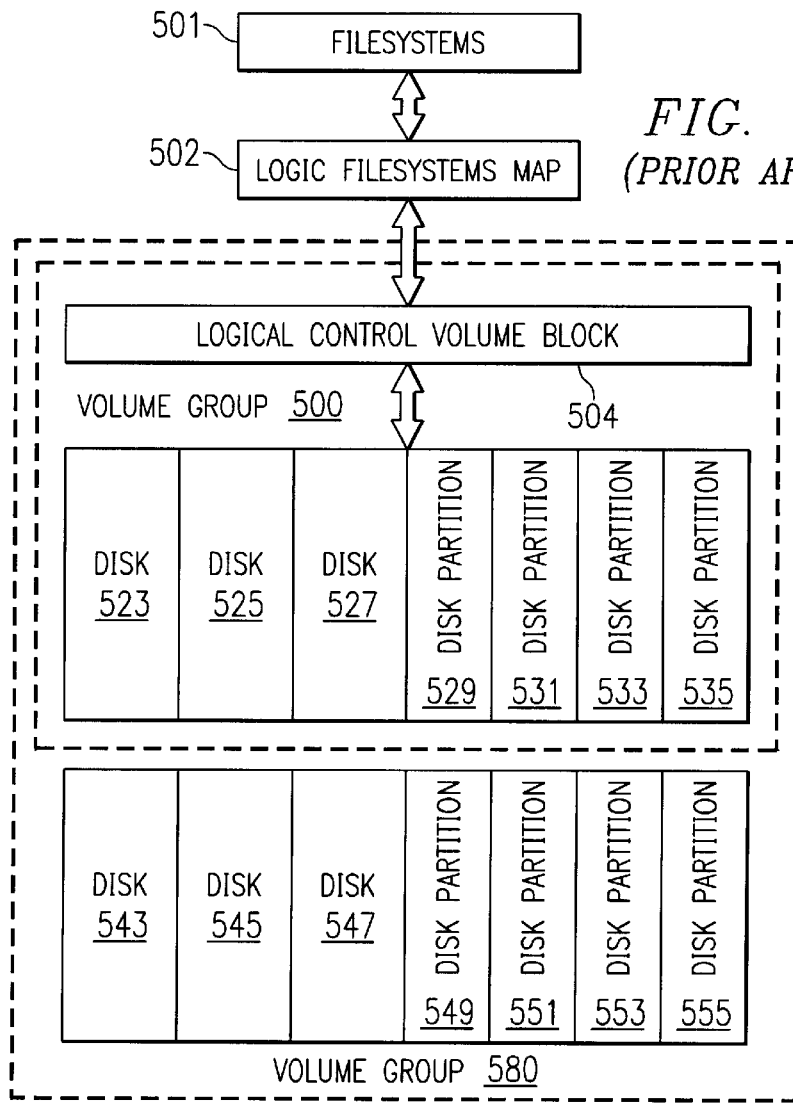
FIG. 5 illustrates a volume group (VG) arrangement of physical volumes (read/write fixed disk drives of varying sizes and types) as might be used for implementing a preferred embodiment of the present invention.

FIG. 5 illustrates a volume group (VG) arrangement of physical volumes (read/write fixed disk drives of varying sizes and types) as might be used for implementing a preferred embodiment of the present invention. FIG. 5 depicts two separate volume groups, volume group 500, and volume group 580, as will be discussed in detail below.

Volume group 500 is a collection of 1 to 32 physical volumes from which space can be allocated to one or more logical volumes. Volume group 500 is defined as a group of varying size and type physical disks containing disks 523, 525 and 527, and disk partitions 529, 531, 533 and 535. Volume group 500 is defined in logical control volume block 504. The logical control volume block normally resides in a location within the volume group, as depicted by the broken line encompassing logical control volume block 504.

Filesystems 501 are logically mapped, using logical filesystems map 502, to physical drives defined by logical control block 504. Using the logical file system map and the logical volume control block, filesystems are logically mapped into logical volumes, which are in turn mapped to physical drives within volume group 500. Data which is written or read from logical files can be mapped to physical disk memories.

From time to time, the physical storage of volume group 500 is not adequate for the amount of data needing to be stored. Therefore, a new, larger volume group must be defined. In this case, volume group 580 includes each disk and partition defined in volume group 500, but it also includes new disks 543, 545 and 547, and disk partitions 549, 551, 553 and 555. What is needed is an efficient means to merge the two volume groups.

Figure 6:
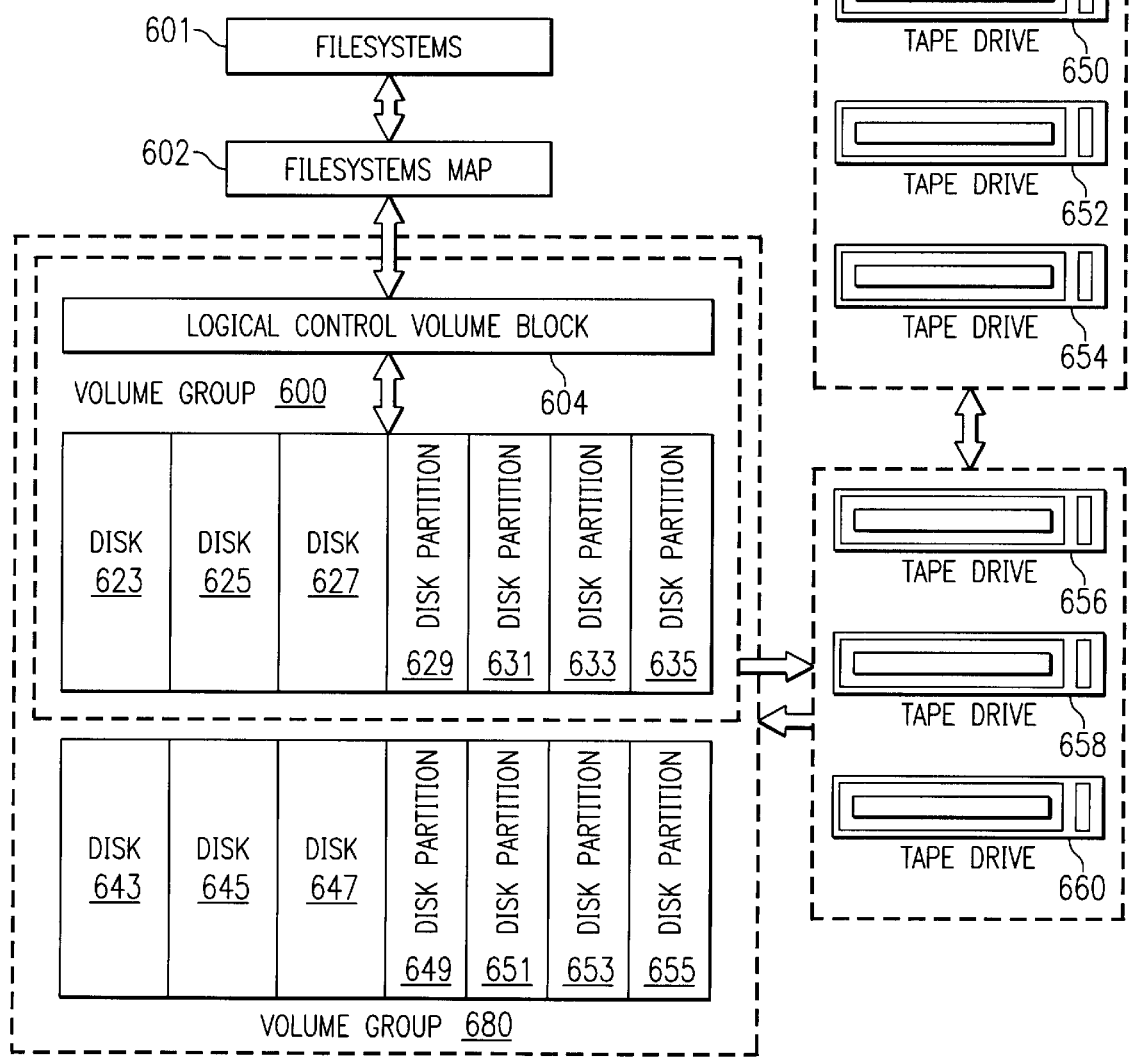
FIG. 6 illustrates the filesystem configuration needed for merging two file groups according to prior art.

FIG. 6 illustrates the filesystem configuration needed for merging two file groups according to prior art. Conventionally, when the filesystems stored in a file group are to be merged into a new file group, the entire logical file structure of the filesystems stored in the volume group must be written to an external memory. Normally, the external memory is a series of tape drives, such as those depicted by tape drives 656, 658 and 660. Problems occur when crucial data stored on hard disks is copied to tape drives. Therefore, the data copied to tape drives 656, 658 and 660 is manually inspected and backed up on auxiliary hard drives 650, 652 and 654.

After the data has been successfully copied from hard disk to tape drives, volume group 600 can be merged into volume group 680. After the new volume group has been defined, the data stored on tape drives 656, 658 and 660 can be copied to volume group 680. The data may be copied directly back to the same identical physical drives from which it came (which are now defined in a new volume group), or it may, instead, be copied to entirely different drives.

Figure 7:
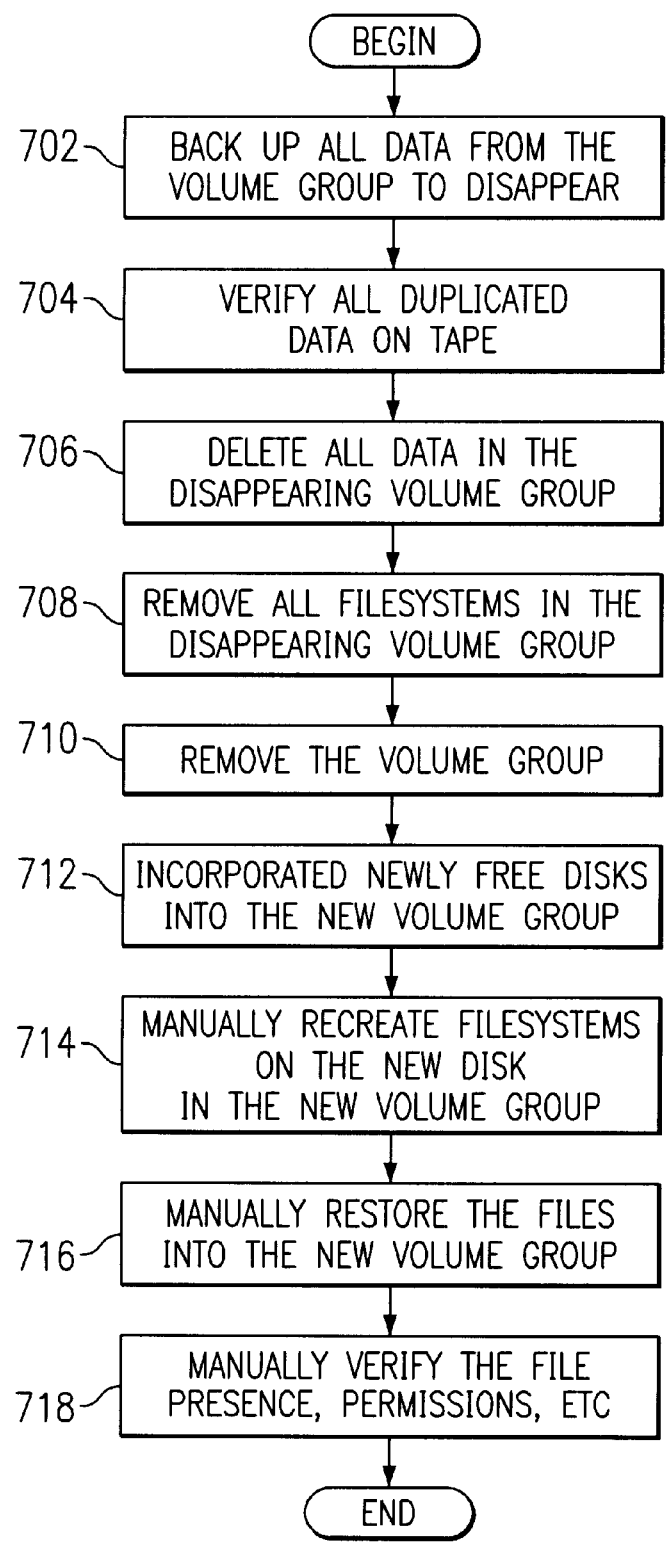
FIG. 7 is a flowchart illustrating a prior art process by which volume groups are expanded or merged.

FIG. 7 is a flowchart illustrating a prior art process by which volume groups are expanded or merged. The process begins by backing up all data from the volume group that is to disappear (step 702). In this case, volume group 600 will disappear, and a new volume group 680 may contain at least some elements of the old volume group 600. Next, all data duplicated to tape must be verified, and a second copy of the data must be made for data integrity certainty (step 704). After the data has been successfully copied from the disappearing volume group (i.e., volume group 600), all data physically stored on volume group 600 may be deleted (step 706).

Next, all filesystems from the disappearing volume group are removed (step 708). The volume group is then removed (step 710). Next, the physical disks formerly defined in the disappearing volume group may be incorporated into a new volume group (step 712). In FIG. 6, this is depicted by the dotted line signifying that volume group 680 contains disks which were formerly in volume group 600. The filesystems must be manually recreated on the new disk(s) in the new volume group (step 714).

After the filesystem has been created on the new volume group, the new files may be manually restored (step 716). Finally, the data stored into the new volume group must be manually verified, including presence of files, permissions, etc. (step 718).

Figure 8:
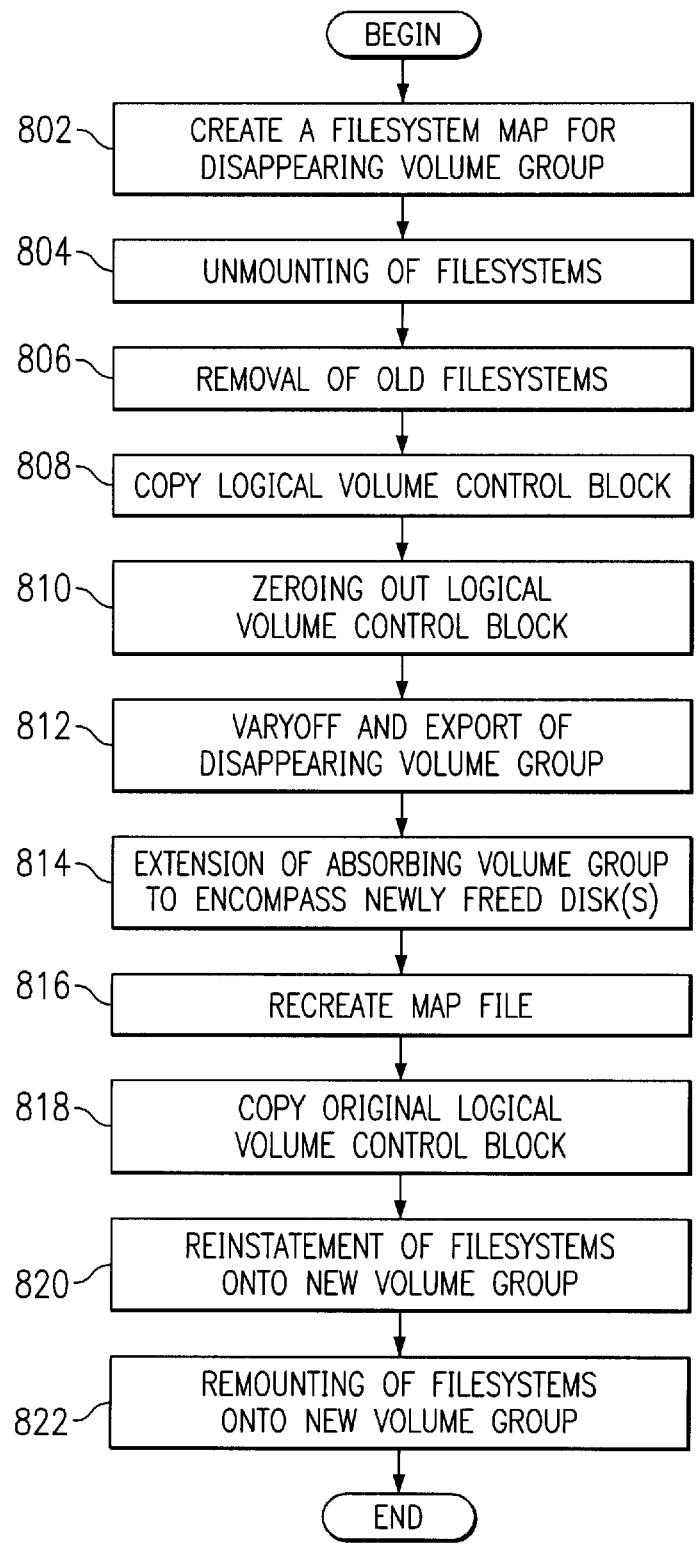
FIG. 8 illustrates a flowchart depicting the process of merging volume groups in accordance with a preferred embodiment of the present invention.

In contrast to the above-discussed prior art, the present invention enables enactment of large-scale UNIX system reconfigurations in a fraction of the time conventionally required. A preferred embodiment of the present invention permits users to specify single or multiple-filesystems in a volume group, and to bring each filesystem over from a "disappearing" volume group into an "absorbing" volume group. Allowing one volume group to absorb the contents of another volume group without use of tape backups and restoration greatly simplifies the administrative tasks associated with conducting large-scale UNIX data reorganizations FIG. 8 illustrates a flowchart depicting the process of merging volume groups in accordance with a preferred embodiment of the present invention. The process begins by creating a filesystem map for filesystems on the disappearing volume group (step 802) A filesystem map maps the location of a logical volume (which contains the filesystem) in regards to its physical location on the disk. Next, the filesystems are unmounted, or made unavailable (step 804). The old filesystems, the arrangement of the logical volume on the physical drive, are then removed (step 806). The volume information in the original volume control block is then copied to a separate location (step 808). The logical volume control block is copied to a different location for recovery purposes, if needed. The original volume control block is zeroed out or written over (step 810). Next, the disappearing volume group is varyoffed and exported (step 812). In an AIX operating system a volume group must be varied on in order for it to be able to be used or for information to be accessed. The volume group must be varyoffed (i.e. turn it off or take it offline) in order to remove all the physical disks that are associated with the volume group.

Next, the absorbing volume group is extended to include the newly freed disks from the disappearing volume group (volume group 680) (in this case, the disks which were defined in volume group 600) (step 814). A map file of the filesystems is then used to recreate the filesystem in the new volume group (step 816). The logical volume information contained in the copy of the original volume control block is then copied to the new volume control block (step 818). Filesystems of the disappearing volume group are now reinstated onto the new volume group (step 820). Finally, filesystems are made available or remounted onto the new volume group (step 822).

FIGS. 9A–D constitute a computer code depicting the process of merging volume groups in an AIX based system.

It is important to note that, while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system implemented method for merging a first volume group into a second volume group, comprising:
    providing the first volume group, wherein the first volume group comprises a logical volume stored in physical disk locations;
    copying information related to a structure of the first volume group;
    deleting information related to the structure of the first volume group contained within the first volume group;
    redefining the second volume group to include physical disks from the first volume group; and
    incorporating the structure of the first volume group with structure information of the second volume group.

2. The method of claim 1, wherein structure information of the first volume group and the second volume group includes a filesystem map.

3. The method of claim 1, wherein structure information of the first volume group and the second volume group includes a logical volume control block.

4. The method of claim 1 further comprises unmounting the first volume group from the system prior to the step of copying and remounting the first volume group from the system subsequent to the step of incorporation.

5. The method of claim 1, wherein the system is a UNIX-based system.

6. The method of claim 1 further comprises creating a filesystem map prior to the step of copying.

7. A data processing system implemented method for merging a first volume group into a second volume group, comprising:
    de-authorizing structure information related to a structure of the first volume group contained within the first volume group;
    defining the second volume group, wherein the second volume group includes all physical memories of the first volume group; and
    authorizing structure information related to a structure of the second volume group contained within the second volume group, wherein structure information includes structure information related to the structure of the first volume group.

8. A data processing system for merging a first volume group into a second volume group, comprising:
    providing means for providing the first volume group, wherein the first volume group comprises a logical volume stored in physical disk locations;
    copying means for copying information related to a structure of the first volume group;
    deleting means for deleting information related to the structure of the first volume group contained within the first volume group;
    redefining means for redefining the second volume group to include physical disks from the first volume group; and
    incorporating means for incorporating the structure of the first volume group with structure information of the second volume group.

9. The system of claim 8, wherein structure information of the first volume group and the second volume group includes a filesystem map.

10. The system of claim 8, wherein structure information of the first volume group and the second volume group includes a logical volume control block.

11. The system of claim 8 further comprises unmounting means for unmounting the first volume group from the system prior to the step of copying, and remounting means for remounting the first volume group from the system subsequent to the step of incorporation.

12. The system of claim 8 wherein the system is a UNIX-based system.

13. The system of claim 8 further comprises creating means for creating a filesystem map prior to the step of copying.

14. A data processing system for merging a first volume group into a second volume group, comprising:
    de-authorizing means for de-authorizing structure information related to a structure of the first volume group contained within the first volume group;
    defining means for defining the second volume group, wherein the second volume group includes all physical memories of the first volume group; and
    authorizing means for authorizing structure information related to a structure of the second volume group contained within the second volume group, wherein structure information includes structure information related to the structure of the first volume group.

15. A computer program product for merging a first volume group into a second volume group comprising:
    providing instructions for providing the first volume group, wherein the first volume group comprises a logical volume stored in physical disk locations;
    copying means for copying instructions for copying information related to a structure of the first volume group;
    deleting means for deleting information related to the structure of the first volume group contained within the first volume group;
    redefining means for redefining the second volume group to include physical disks from the first volume group; and
    incorporating means for incorporating the structure of the first volume group with structure information of the second volume group.

* * * * *

UNITED STATES PATENT AND TRADEMARK OFFICE
CERTIFICATE OF CORRECTION

PATENT NO. : 6,567,811 B1  Page 1 of 1
DATED : May 20, 2003
INVENTOR(S) : Edwards et al.

It is certified that error appears in the above-identified patent and that said Letters Patent is hereby corrected as shown below:

Column 2,
Line 24, after "unset);" delete return.

Signed and Sealed this

Fourth Day of November, 2003

JAMES E. ROGAN
*Director of the United States Patent and Trademark Office*